US00H002248H

(19) United States
(12) Statutory Invention Registration
Brundage et al.

(10) Reg. No.: US H2248 H
(43) Published: Sep. 7, 2010

(54) BLENDING OF ECONOMIC, REDUCED OXYGEN, WINTER GASOLINE

(75) Inventors: Scott R. Brundage, Richmond, CA (US); David A. Kohler, Oakland, CA (US); Richard T. Engle, Fairfield, CA (US)

(73) Assignee: Chevron U.S.A. Inc., PA (US)

(21) Appl. No.: 10/289,316

(22) Filed: Nov. 7, 2002

Related U.S. Application Data

(63) Continuation of application No. 09/603,556, filed on Jun. 26, 2000, now abandoned, which is a continuation-in-part of application No. 09/240,059, filed on Jan. 29, 1999, now abandoned.

(51) Int. Cl.
*C10L 1/04* (2006.01)

(52) U.S. Cl. ..... 208/17; 208/16
(58) Field of Classification Search ..... 208/16, 208/17
See application file for complete search history.

(56) References Cited

U.S. PATENT DOCUMENTS 5,288,393 A * 2/1994 Jessup et al. ..... 208/16
5,401,280 A * 3/1995 Kaneko et al. ..... 44/449
6,132,479 A * 10/2000 Welstand et al. ..... 44/300
6,290,734 B1 * 9/2001 Scott et al. ..... 208/17
6,328,772 B1 * 12/2001 Scott et al. ..... 208/17
6,383,236 B1 * 5/2002 Welstand et al. ..... 44/300
2002/0014035 A1 * 2/2002 Scott et al. ..... 208/17
2002/0068842 A1 * 6/2002 Brundage et al. ..... 208/17
2004/0020824 A1 * 2/2004 Brundage et al. ..... 208/17

* cited by examiner

*Primary Examiner*—Dan Pihulic
(74) *Attorney, Agent, or Firm*—Burns, Doane, Swecker & Mathis, L.L.P.

(57) ABSTRACT

Provide is a novel gasoline composition which is substantially free of oxygenates and is in compliance with the California Phase 3 Predictive Model. The gasoline composition is suitable for use in the winter months, i.e., having a Reid vapor pressure in the range of greater than 7.0 to about 15.0 psi. The method for blending the gasoline comprises blending streams from a refinery in a controlled manner to maintain compliance with the California Phase 3 Predictive Model.

59 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Overview of Gasoline Blending System

Figure 1. Overview of Gasoline Blending System

CARB GASOLINE "SPACE"

BLENDING OF ECONOMIC, REDUCED OXYGEN, WINTER GASOLINE

CROSS-REFERENCE TO RELATED APPLICATIONS

This application is a continuation of application Ser. No. 09/603,556, filed on Jun. 26, 2000, abandoned.

The present application is a continuation-in-part application of U.S. Ser. No. 09/240,059, filed on Jan. 29, 1999, abandoned.

BACKGROUND OF THE INVENTION

1. Field of the Invention

The present invention relates to fuels, particularly gasoline fuels which are substantially oxygenate free, More specifically, the present invention relates to a low-emission gasoline fuel which complies with the California Phase 3 Predictive Model, as well as ASTM D4814, and is also substantially tree of oxygen-containing compounds.

2. Brief Description of the Prior Art

One of the major environmental problems confronting the United States and other countries is atmospheric pollution caused by the emission of pollutants in the exhaust gases and gasoline vapor emissions from gasoline fueled automobiles. This problem is especially acute in major metropolitan areas where atmospheric conditions and the great number of automobiles result in aggravated conditions. While vehicle emissions have been reduced substantially, air quality still needs improvement. The result has been that regulations have been passed to further reduce such emissions by controlling the composition of gasoline fuels. These specially formulated, low emission gasolines are often referred to as reformulated gasolines. California's very strict low emissions gasoline is often referred to as California Phase 2 or Phase 3 gasoline. In these gasolines, oxygen-containing hydrocarbons, or oxygenates, are often blended into the fuel.

Congress and regulatory authorities, such as CARB (the California Air Resources Board), have focused on setting specifications for low emissions, reformulated gasoline. The specifications, however, require the presence of oxygenates in gasoline sold in areas that are not in compliance with federal ambient air quality standards for ozone, and the degree of non-attainment is classified as severe, or extreme. Among the emissions which the reformulated gasoline is designed to reduce, are nitrogen oxides ($NO_x$), hydrocarbons (HC), and toxics (benzene, 1,3-butadiene, formaldehyde and acetaldehyde). A reduction in these emissions has been targeted due to their obvious impact upon the air we breathe and the environment in general.

Oxygenated gasoline is a mixture of conventional hydrocarbon-based gasoline and one or more oxygenates. Oxygenates are combustible liquids which are made up of carbon, hydrogen and oxygen. All the current oxygenates used in reformulated gasolines belong to one of two classes of organic molecules: alcohols and ethers. The Environmental Protection Agency regulates which oxygenates can be added to gasoline and in what amounts.

The primary oxygen-containing compound employed in gasoline fuels today are methyl tertiary butyl ether (MTBE) and ethanol. While oxygen is in most cases required in reformulated gasolines to help effect low emissions, the presence of oxygenates such as MTBE and ethanol in gasoline fuels has begun to raise environmental concerns. For example, MTBE has been observed in drinking water reservoirs, and in a few instances, ground water in certain areas of California. Ethanol has raised concerns regarding hydrocarbon emissions on fueling. As a result, the public is beginning to question the benefits and/or importance of having oxygen based cleaner burning gasolines, if they simply pollute the environment in other ways. Furthermore, oxygenates such as ethers also have a lower thermal energy content than non-oxygenated hydrocarbons, and therefore reduce the fuel economy of gasoline fueled motor vehicles.

Thus, while some of the concerns with regard to gasoline fuels containing oxygenates could be overcome by further safe handling procedures and the operation of present facilities to reduce the risk of any spills and leaks, there remains a growing public concern with regard to the use of oxygenates in gasoline fuels. In an effort to balance the need for lower emission gasolines and concerns about the use of oxygenates it, therefore, would be of great benefit to the industry if a cleaner burning gasoline without oxygenates could be made which complied with the requirements of the regulatory authorities (such as CARB). The availability of such a gasoline, which contained substantially no oxygenates, would allow the public to realize the environmental benefits of low emissions, yet ease the concern of potential contamination of ground waters, and the environment in general, with oxygenates. Of benefit to the industry would also be the economies of such a low emission gasoline which contained substantially no oxygenates.

Accordingly, it is an object of the present invention to provide a gasoline fuel, and a method of blending same, which can truly benefit the environment and continue to be suitable for use as a motor gasoline.

It is yet another object of the present invention to provide an economic and commercially plausible method for blending such a gasoline fuel.

It is another object of the present invention is to provide a gasoline fuel, and method of blending same, which provides good emissions, yet is substantially free of oxygenates.

Still another object of the present invention is to provide such a gasoline fuel, and method of blending same, which is suitable for the winter season.

These and other objects of the present invention will become apparent upon a review of the following specification, the Figures of the Drawing and the claims appended thereto.

SUMMARY OF THE INVENTION

In accordance with the foregoing objectives, there is provided by the present invention a method of blending a gasoline suitable for use in the winter months, i.e., having a Reid vapor pressure in the range of from greater than 7.00 to about 15.00 psi, which is substantially free of oxygenates. The method comprises blending streams from a refinery, while maintaining the blend substantially tree of oxygenates, in a controlled manner to maintain compliance with the California Predictive Model. It is preferred that testing of the blended fuel occurs during blending for compliance with the California Predictive Model, with adjustments made in the blends based on the results of the testing to thereby maintain compliance with the California Predictive Model.

Among other factors, the present invention is based in part upon the recognition that the blending process of some or all, of the gasoline component streams of an oil refinery, can be controlled, while eliminating oxygenates, to successfully provide by an economic, continuous blending process for a low-emission gasoline substantially free of oxygenates which is in compliance with the California Predictive Model. The difficulty arises in eliminating oxygenates, as a significant difference in blending is required in the absence of oxygenates to achieve the requisite octane rating while also meeting the California Predictive Model specifications. MTBE in particular is a high octane, low boiling, moderate RVP component and its elimination presents considerable obstacles to successfully blending a gasoline, particularly a high octane gasoline. Yet, it has been discovered that appropriate blending can occur to provide a commercially economic, low-emission gasoline blend suitable for winter using the gasoline-component streams of a refinery. Generally, testing on either a periodic or continuous basis of the blended streams, with subsequent adjustments in the blends based on the results of the testing, is employed in order to maintain compliance with the California Predictive Model. This is particularly preferred as the streams in a refinery can change in composition over time.

In another embodiment, the present invention provides one with a novel, winter gasoline which is substantially free of oxygenates and is in compliance with the California Predictive Model. The compositions are preferably blended by the methods of the present invention, and most preferably contain low amounts of sulfur.

DETAILED DESCRIPTION OF THE INVENTION

Figure 1:
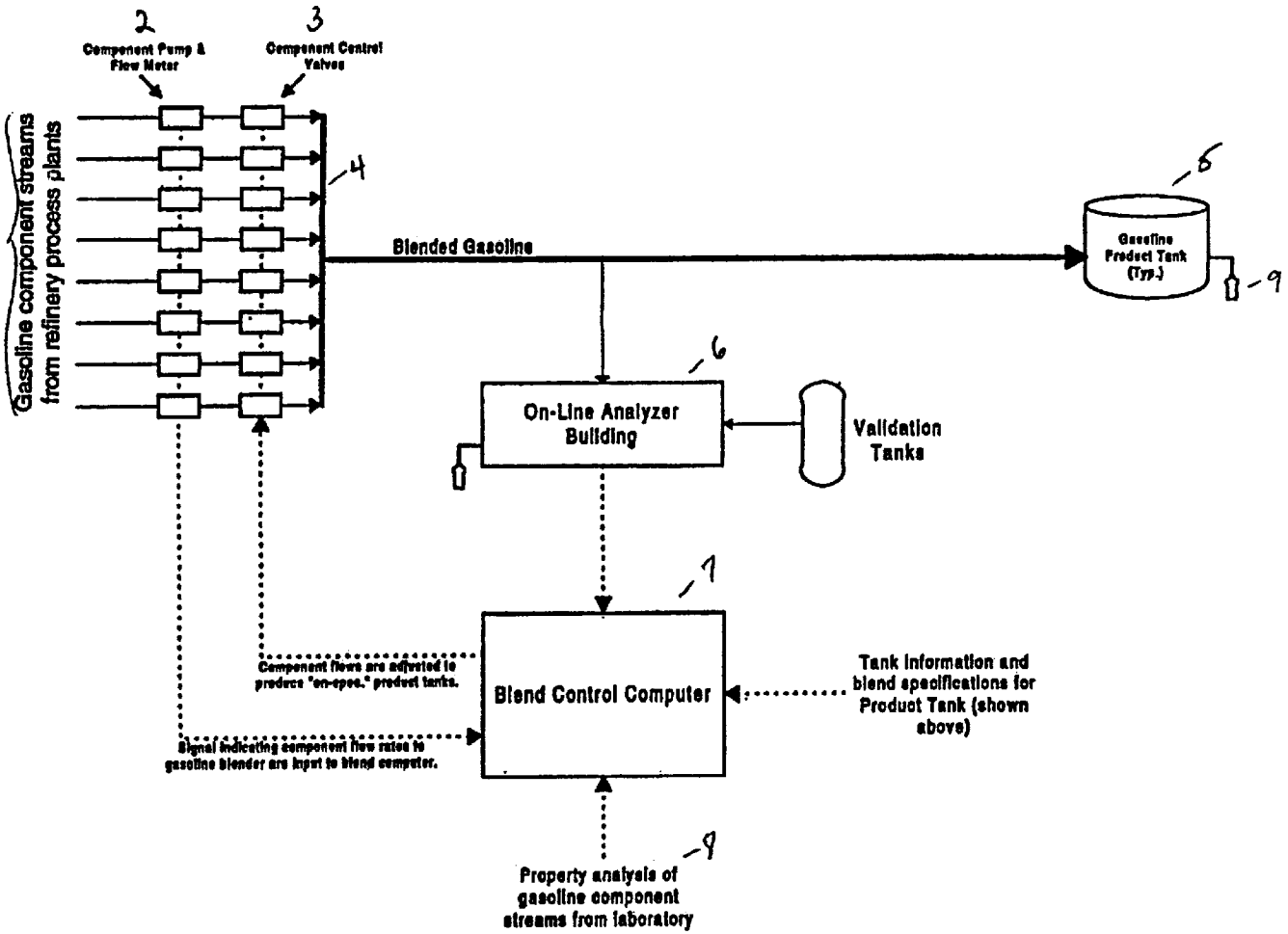
FIG. 1 of the drawing schematically depicts a gasoline blending system in accordance with the present invention.

Gasolines are well known fuels, generally composed of a mixture of numerous hydrocarbons having different-boiling points at atmospheric pressure, Thus, a gasoline fuel boils or distills over a range of temperatures, unlike a pure compound. In general, a gasoline fuel will distill over the range of from about, room temperature to 437° F. (225° C.). This temperature range is approximate, of course, and the exact range will depend on the conditions that exist in the location where the automobile is driven. The distillation profile of the gasoline can also be altered by changing the mixture in order to focus on certain aspects of gasoline performance, depending on the time of year and geographic location in which the gasoline will be used.

Gasolines are therefore typically composed of a hydrocarbon mixture containing aromatics, olefins, naphthenes and paraffins, with reformulated gasoline most often containing an oxygen compound, e.g., an ether such as methyl tertiary butyl ether. The fuels contemplated in the present invention are substantially oxygenate free unleaded gasolines (herein defined as containing a concentration of lead no greater than 0.05 gram of lead per gallon which is 0.013 gram of lead per liter). The anti-knock value (R+M)/2 for regular gasoline is generally at least 87, and for premium at least 91, and generally at least 92.

In an attempt to reduce harmful emissions upon the combustion of gasoline fuels, regulatory boards as well as Congress have developed certain specifications for reformulated gasolines. One such regulatory board is that of the State of California, i.e., the California Air Resources Board (CARB). In 1991, specifications were developed by CARB for California gasolines which, based upon testing, should provide good performance and low emissions. The specifications and properties of the reformulated gasoline, which is referred to as the Phase 2 reformulated gasoline or California Phase 2 gasoline, are shown in Table 1 below.

TABLE 1

Properties and Specifications for Phase 2 Reformulated Gasoline

| Fuel Property | Units | Flat Limit | Averaging Limit | Cap Limit |
|---|---|---|---|---|
| Reid vapor pressure (RVP) | psi, max. | 7.00[1] | | 7.00[1] |
| Sulfur (SUL) | ppmw | 40 | 30 | 80 |
| Benzene (BENZ) | vol. %, max. | 1.00 | 0.80 | 1.20 |
| Aromatic HC (AROM) | vol. %, max. | 25.0 | 22.0 | 30.0 |
| Olefin (OLEF) | vol. %, max. | 6.0 | 4.0 | 10.0 |
| Oxygen (OXY) | wt. % | 1.8 (min)<br>2.2 (max) | | 0 (min)<br>3.5 (max) |
| Temperature at 50% distilled (T50) | deg. F. | 210 | 200 | 220 |
| Temperature at 90% distilled (T90) | deg. F. | 300 | 290 | 330 |

[1]Applicable during the summer months identified in 13 CCR, sections 2262.1(a) and (b); California requires adherence to ASTM specifications.

Recently, Phase 3 regulations have been developed. At present, the gasoline can meet either Phase 2 or Phase 3 regulations, but beginning Jan. 1, 2003, Phase 3 regulations must be met. The specifications and properties of the reformulated California Phase 3 gasoline are shown in Table 2 below:

TABLE 2

Properties and Specifications for Phase 3 Reformulated Gasoline

| Fuel Property | Units | Flat Limit | Average Limit | Cap Limit |
|---|---|---|---|---|
| Reid vapor pressure (RVP) | psi, max. | 7.00 | | 6.40-7.20[1] |
| Sulfur (SUL) | ppmw | 20 | 15 | 60[2]/30[3] |
| Benzene (BENZ) | vol. %, max. | 0.80 | 0.70 | 1.10 |
| Aromatic HC (AROM) | vol. %, max. | 25.0 | 22.0 | 35.0 |
| Olefin (OLEF) | vol. %, max. | 6.0 | 4.0 | 10.0 |
| Oxygen (OXY) | wt. % | 1.8 (min)<br>2.2 (max) | | 3.7[4] |
| Temperature at 50% distilled (T50) | deg. F. | 213 | 203 | 220 |
| Temperature at 90% distilled (T90) | deg. F. | 305 | 295 | 330 |

[1]Applicable during the summer months identified in 13 CCR, sections 2262.1(a) and (b); California requires adherence to ASTM specifications.
[2]Jan. 1, 2003-Dec. 31, 2004.
[3]Beginning Jan. 1, 2005.
[4]For ethanol only.

In Tables 1 and 2, as well as for the rest of the specification, the following definitions apply:

Aromatic hydrocarbon content (Aromatic HC, AROM) means the amount of aromatic hydrocarbons in the fuel expressed to the nearest tenth of a percent by volume in accordance with 13 CCR (California Code of Regulations), section 2263.

Benzene content (BENZ) means the amount of benzene contained in the fuel expressed to the nearest hundredth of a percent by volume in accordance with 13 CCR, section 2263.

Olefin content (OLEF) means the amount of olefins in the fuel expressed to the nearest tenth of a percent by volume in accordance with 13 CCR, section 2263.

Oxygen content (OXY) means the amount of actual oxygen contained in the fuel expressed to the nearest tenth of a percent by weight in accordance with 13 CCR, section 2263.

Potency-weighted toxics (PWT) means the mass exhaust emissions of benzene, 1,3-butadiene, formaldehyde, and acetaldehyde, each multiplied by their relative potencies with respect to 1,3-butadiene, which has a value of 1.

Predictive model means a set of equations that relate emissions performance based on the properties of a particular gasoline formulation to the emissions performance of an appropriate baseline fuel.

Reid vapor pressure (RVP) means the vapor pressure of the fuel expressed to the nearest hundredth of a pound per square inch in accordance with 13 CCR, section 2263.

Sulfur content (SUL) means the amount by weight of sulfur contained in the fuel expressed to the nearest part per million in accordance with 13 CCR, section 2263.

50% distillation temperature (T50) means the temperature at which 50% of the fuel evaporates expressed to the nearest degree Fahrenheit in accordance with 13 CCR, section 2263.

90% distillation temperature (T90) means the temperature at which 90% of the fuel evaporates expressed to the nearest degree Fahrenheit in accordance with 13 CCR, section 2263.

Toxic air contaminants means exhaust emissions of benzene, 1,3-butadiene, formaldehyde, and acetaldehyde.

The pollutants addressed by the foregoing specifications include oxides of nitrogen ($NO_x$), and hydrocarbons (HC), which are generally measured in units of gm/mile, and potency-weighted toxics (PWT), which are generally measured in units of mg/mile.

The California Phase 2 and Phase 3 reformulated gasoline regulations define a comprehensive set of specifications for gasoline (Tables 1 and 2). These specifications have been designed to achieve large reductions in emissions of criteria and toxic air contaminants from gasoline-fueled vehicles. Gasolines which do not meet the specifications are believed to be inferior with regard to the emissions which result from their use in vehicles. All gasolines sold in California, beginning Jun. 1, 1996, have had to meet CARB's Phase 2 requirements as described below, and beginning Jan. 1, 2003, Phase 3 regulations must be met. The specifications address the following eight gasoline properties:

Reid vapor pressure (RVP)—summer only

Sulfur

Oxygen

Aromatic hydrocarbons

Benzene

Olefins

Temperature at which 90 percent of the fuel has evaporated (T90)

Temperature at which 50 percent of the fuel has evaporated (T50)

The Phase 2 and Phase 3 gasoline regulations include gasoline specifications that must be met at the time the gasoline is supplied from the production facility. Producers have the option of meeting either "flat" limits or, if available, "averaging" limits, or, alternatively a Predictive Model equivalent performance standard using either the "Flat" or "averaging" approach.

The flat limits must not be exceeded in any gallon of gasoline leaving the production facility when using gallon compliance. For example, the aromatic content of gasoline, subject to the default flat limit, could not exceed 25 volume percent (see Tables 1 and 2).

The averaging limits for each fuel property established in the regulations are numerically more stringent than the comparable flat limits for that property. Under the averaging option, the producer may assign differing "designated alternative limits" (DALs) to different batches of gasoline being supplied from the production facility. Each batch of gasoline must meet the DAL assigned for the batch. In addition, a producer supplying a batch of gasoline with a DAL less stringent than the averaging limit must, within 90 days before or after, supply from the same facility sufficient quantities of gasoline subject to more stringent DALs to fully offset the exceedances of the averaging limit. Therefore, an individual batch may not meet the California Phase 2 or Phase 3 Predictive Model when using averaging, but in the aggregate, over time, they must.

The Phase 2 and Phase 3 gasoline regulations also contain "cap" limits. The cap limits are absolute limits that cannot be exceeded in any gallon of gasoline sold or supplied throughout the gasoline distribution system. These cap limits are of particular importance when the California Predictive Model or averaging is used.

A mathematical model, the California Predictive Model, has also been developed by CARB to allow refiners more flexibility. Use of the predictive model is designed to allow producers to comply with the Phase 2 or Phase 3 gasoline requirements by producing gasoline to specifications different from either the averaging or flat limit specifications set forth in the regulations. However, producers must demonstrate that the alternative Phase 2 or Phase 3 gasoline specifications will result in equivalent or lower emissions compared to Phase 2 or Phase 3, respectively, gasoline meeting either the flat or averaging limits as indicated by the Predictive Model. Further, the cap limits must be met for all gasoline formulations, even alternative formulations allowed under the California Predictive Model. When the Predictive Model is used, the eight parameters of Tables 1 and 2 are limited to the cap limits.

In general, the California Predictive Model is a set of mathematical equations that allows one to compare the expected exhaust emissions performance of a gasoline with a particular set of fuel properties to the expected exhaust emissions performance of an appropriate gasoline fuel. One or more selected fuel properties can be changed when making this comparison.

Generally, in the predictive model, separate mathematical equations apply to different indicators. For example, a mathematical equation could be developed for an air pollutant such as hydrocarbons; or, a mathematical equation could be developed for a different air pollutant such as the oxides of nitrogen.

Generally, a predictive model for vehicle emissions is typically characterized by:

the number of mathematical equations developed, the number and type of motor vehicle emissions tests used in the development of the mathematical equations, and the mathematical or statistical approach used to analyze the results of the emissions tests.

The California Predictive Model is comprised of eighteen (18) mathematical equations. One set of six equations predicts emissions from vehicles in Technology Class 3 (model years 1981-1985), another set of six is for Technology Class 4 (model years 1986-1995), and another set for Technology class 5 (model years 1996-2005). For each technology class, one equation estimates the relative amount of exhaust emissions of hydrocarbons, the second estimates the relative amount of exhaust emissions of oxides of nitrogen, and four are used to estimate the relative amounts of exhaust emissions of the four toxic air contaminants: benzene, 1,3-butadiene, acetaldehyde, and formaldehyde. These toxic air contaminants are combined based on their relative potential to cause cancer, which is referred to as potency-weighting.

In creating the California Predictive Model, CARB compiled and analyzed the results of over 7,300 vehicle exhaust emissions tests. A standard statistical approach to develop the mathematical equations to estimate changes in exhaust emissions was used based upon the data collected. It is appreciated that the California Predictive Model might change with regard to certain of the components considered and their limits. In fact, at present, as discussed above, there exists a California Phase 2 Predictive Model and a California Phase 3 Predictive Model. However, it is believed that the present invention and its discovery that a blending process in accordance therewith can be used to create the gasolines of the present invention, can be used to effectively blend a gasoline in compliance with the specifications of any California Predictive Model.

In summary, specific requirements were created by the California Air Resources Board to restrict the formulation of gasoline to ensure the production of gasoline which produces low emissions when used in automobiles.

The present invention provides one with a method of blending a low emission, oxygenate free gasoline economically and in a commercially plausible manner. The gasoline obtained is in compliance with the California Predictive Model, at present, either the Phase 2 Predictive Model or the Phase 3 Predictive Model, and it contains substantially no oxygenates. The gasoline is also in compliance with ASTM D4814. By substantially free of oxygenates, for the present invention, it is meant that there is less than 0.5 wt. %, more preferably less than 0.1 wt %, and most preferably less than 0.05 wt % of oxygen attributable to oxygen containing compounds in the blended gasoline. It is also preferred that the gasoline of the present invention be low in sulfur content. It is most preferred that the sulfur content is less than 30 ppm, more preferably less than 20 ppm, even more preferably less than 10 ppm, and most preferably less than 5 ppm. The amount of sulfur can be controlled by specifically choosing streams which are low in sulfur for blending in the gasoline. The low level of sulfur can be an important aspect of the present invention.

The gasoline compositions of the present invention also preferably have a $T_{50}$ of less than 200° F., or preferably less than 195° F., and most preferably about 185° F. or less when Phase 2 gasoline is being blended, preferable less than 203° F., more preferably less than 200° F. and most preferably less than 190° F. if Phase 3 gasoline is being blended. The olefin content is also less than 4 wt %, more preferably less than 3 vol. %, and most preferably less than 2 vol. %. The amount of benzene is also less than 0.5 vol. % in the most preferred embodiment.

As the gasoline of the present invention is designed for the winter months, the RVP is generally higher. The RVP can generally range from 7.0 to 15.0 psi, more preferably from 7.2 or 7.3 to 15.0, and most preferably in the range of from 8.0 to 13.5.

The gasoline compositions blended can be a regular, mid-grade or premium gasoline. For example, the gasolines can exhibit an octane number (R+M)/2 of from 87 to 89, 89 to 92, or 92 or even 93 and greater.

In a preferred embodiment, the gasoline composition contains less than 0.1 wt. % oxygenates, and less than 20 ppm sulfur, and more preferably less than 10 ppm sulfur. Another preferred gasoline composition of the present invention exhibits a $T_{50}$ less than 203° F. and contains less than 10 ppm sulfur.

The method of the present invention comprises blending gasoline component streams from refinery process plants. Any of the conventional gasoline component streams which are blended into gasolines can be used. A schematic of a suitable system is shown in FIG. 1 of the Drawing. The gasoline component streams are provided at 1, and flow through component pump and flow meters 2. Component control valves 3 control how much of each stream is let into the blending process 4, to create the blended gasoline. The blended gasoline is then generally stored in a gasoline product tank 5.

To begin the process, a blending model can be used to approximate the blending of the gasoline. Such blending models can be created via experience of blending gasolines in compliance with the California Predictive Model. They help to predict compliance with the California Predictive Model and are important tools in beginning the process. It is generally important, however, to include an analysis of the blended gasoline to maintain compliance of the California Predictive Model. Such testing can be periodic or continuous. In general, it is preferred to use an on- line analyzer as shown at 6. Generally, the analysis run involves the entire boiling range of the gasoline, including $T_{50}$ and $T_{90}$, the RVP of the blended gasoline, the benzene/aromatics content, the olefins content, the oxygenates content and the sulfur content. The tests run can be as follows.

For distillation, the analyzer utilizes an Applied Automation Simulated Distillation Motor Gasoline Gas Chromatograph. This analyzer is similar to the instrument described in ASTM D 3710-95: Boiling Range Distribution of Gasoline by Gas Chromatography. This test method is designed to measure the entire boiling range of gasoline, either high or low Reid Vapor Pressures, and has been validated for gasolines containing the oxygenates methyl tertiary butyl ether (MTBE) and tertiary amyl methyl ether (TAME). Alternatively, the ASTM D86 distillation method can be used, although not preferred for an on-line analyzer. Either test can be run.

Measuring RVP utilizes an ABB Model 4100 Reid Vapor Pressure Analyzer. This analyzer is described in ASTM D 5482-96. This is a substitute for the "CARB RVP" calculation based on the Dry-Vapor Pressure result from D5191, which is itself a substitute for ASTM method 393-89. Either can be used.

The method for measuring benzene and aromatic content can utilize the Applied Automation Standard Test Method for Determination of Benzene, Toluene, C8 and Heavier Aromatics, and Total Aromatics in Finished Motor Gasoline Gas Chromatograph. The analyzer is similar to the instrument described in ASTM D 5580-95: Standard Tests Method for Determination of Benzene, Toluene, Ethylbezene, p/m-Xylene, C9 and Heavier Aromatics, and Total Aromatics in Finished Gasoline by Gas Chromatography. This is substitute for ASTM D5580 and ASTM D1319 (for aromatics) and ASTM D3606 (for benzene) methods which methods can also be used.

Olefin content can be measured using any suitable method. ASTM D1319 is Presently preferred. Other methods can also be used.

For oxygenates, the method utilizes an Applied Automation Oxygenate Gas Chromatograph. The method is designed to quantify the amount of methyl tertiary butyl ether (MTBE), ethyl tertiary butyl ether (ETBE), tertiary and amyl methyl ether (TAME), and ethanol in a hydrocarbon matrix. This is a substitute for ASTM D4815 distillation method, which can also be used.

For measurement of sulfur content, the analyzer can utilize an ABB Model 3100: Sulfur in Gasoline Gas Chromatograph. The method is designed to quantify the amount of sulfur in a hydrocarbon steam as a substitute for the ASTM D2622 or D5453-93 method, which can also be used.

The information from the analysis is then fed to a computer 7 which can control the component flows to produce a gasoline blend which complies with the California Predictive Model for the winter season. The information provided to the computer can comprise information from on-line analysis, as well as information from an analysis conducted in a laboratory 8. If desired, tank information and blend specifications for the gasoline in the product tank can also be provided to the computer. Samples can be drawn from the gasoline product tank, for example, at 9, for laboratory testing.

It has been discovered that a gasoline can be economically and feasibly blended, particularly on a continuous basis, using the streams from a refinery, despite variations in those streams, to achieve a blended gasoline meeting the specifications of the California Predictive Model. By eliminating oxygenates, such as MTBE, the number of gasoline blends possible to meet the predictive model becomes much smaller. Yet, it has been found that the blending system of the present invention can still economically and feasibly provide such a blended gasoline compliant with the California Predictive Model. An example of the reduction in the gasoline blends suitable once MTBE is eliminated, can be better appreciated upon a review of FIGS. 2 and 3.

Figure 2:
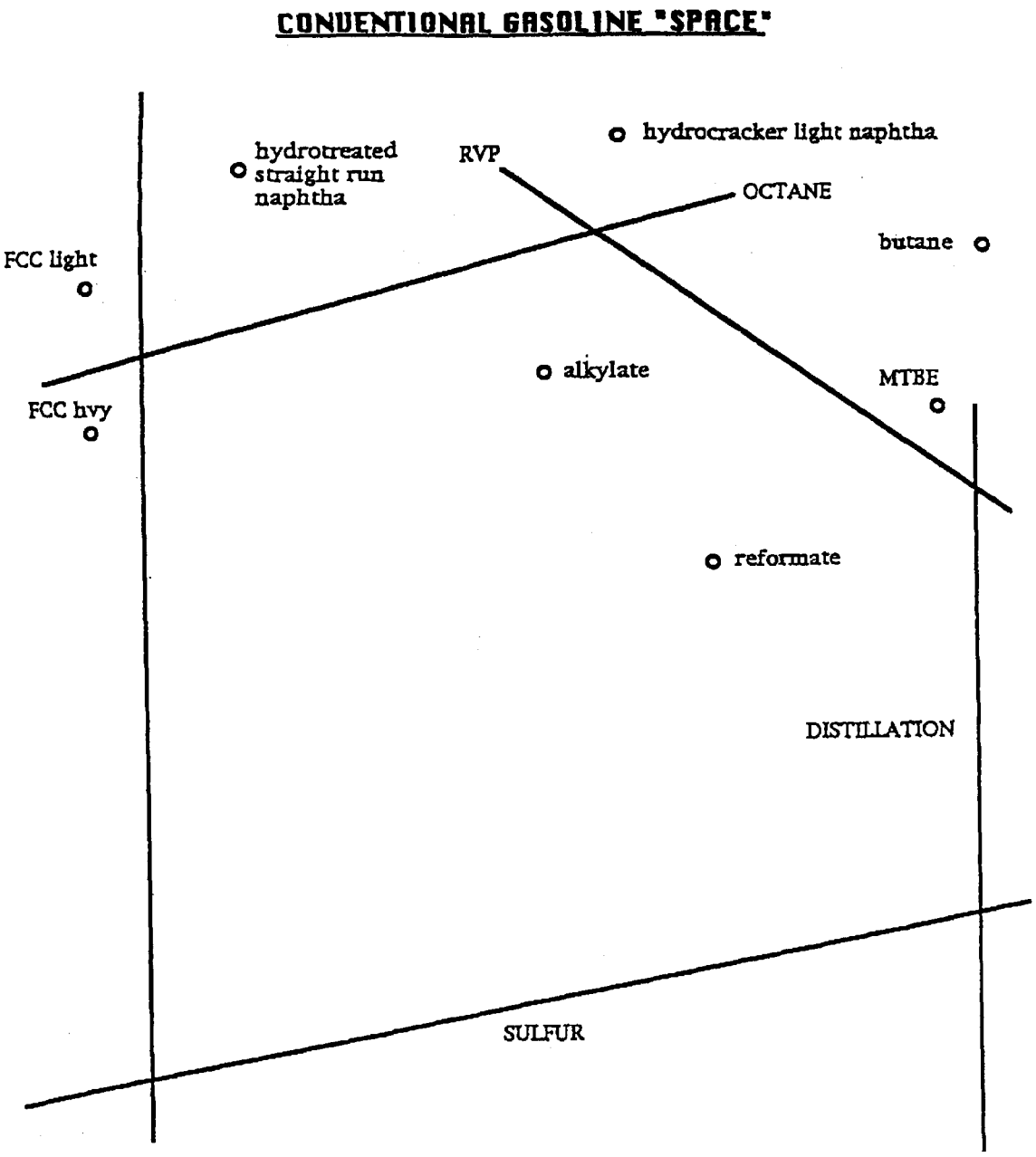
FIG. 2 illustrates the relative number of conventional gasolines that can be blended.
Figure 3:
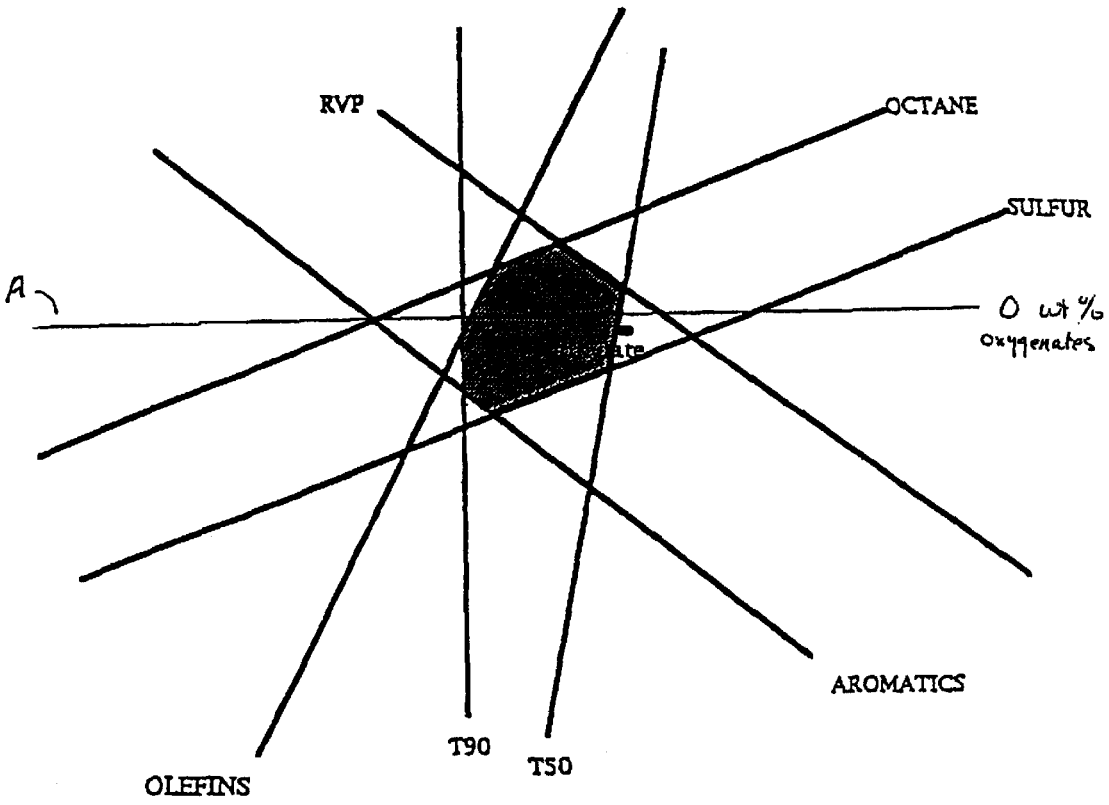
FIG. 3 illustrates the relative number of low-emission gasolines that can be blended when containing oxygenates, and when containing substantially no oxygenates.

In FIG. 2 of the Drawing, the central portion enclosed by the various lines indicates the various gasoline blends that would meet the requirements for conventional gasoline. In FIG. 3, this portion (which indicates the amount of gasoline formulations suitable) is reduced due to the requirements of the California Predictive Model, but the space is still workable. When one requires substantially no oxygenates, however, the compositions must fall close to the line A shown in FIG. 3, thus, substantially limiting the number of gasoline blends possible.

It has been discovered by the inventors than one can in fact successfully and economically blend a winter grade gasoline compliant with the California Predictive Model. It is preferred, in the blending, that testing occurs to assure that the blending of the gasoline results in a blended gasoline which is compliant with the California Predictive Model. It has been discovered that such analysis, particularly when on- line, can quickly result in the necessary adjustments to provide a compliant gasoline.

The process of the present invention, therefore, can be used to prepare an economic low-emission gasoline for non-federal RFG areas for the winter, which blended gasoline meets the California Predictive Model, presently either Phase 2 or Phase 3, and the specifications of CARB. The blended gasoline is economic in that it involves the blending of gasoline component streams received directly from the refinery, yet the gasoline also contains substantially no oxygenates.

The present invention will be further illustrated by the following Examples, which are provided purely for illustration and are not meant to be unduly limiting. Where percentages are mentioned in the following Examples, and throughout the specification, the parts and percentages are by weight unless otherwise specified.

EXAMPLE 1

A number of different blended gasolines were made using the blending system depicted in FIG. 1, with an on-line analyzer. All of the various blended gasolines, Nos. 1-23, were made at different times using different component streams from a refinery. All of the blended gasolines, however, are deemed to be in compliance with the California Phase 2 and Phase 3 Predictive Model.

The various component streams used were conventional gasoline component streams including:

(i) light petroleum-butane/pentane;

(ii) pentane/hexane;

(iii) hydrobate (reformer feed);

(iv) reformate;

(v) FCC gasoline;

(vi) alkylate;

(vii) toluene.

All of the foregoing component streams were provided from the same refinery. However, any one of the streams used, and particularly toluene, can be provided from an outside source, but it is preferred for the present invention that the component streams originate as streams in the refinery on site.

Provided below in Tables 3 and 4 are the qualities of each of the gasolines successfully blended in accordance with the present invention, with each complying with the California Phase 2 and Phase 3 Predictive Model and containing substantially no oxygenates. The examples demonstrate that such gasoline can be successfully blended using gasoline component streams from a refinery so as to comply with the California Predictive Model, yet contain substantially no oxygenates.

TABLE 3

| BLEND QUALITIES | NO. 1 | NO. 2 | NO. 3 | NO. 4 | NO. 5 | NO. 6 | NO. 7 | NO. 8 | NO. 9 | NO. 10 | NO. 11 |
|---|---|---|---|---|---|---|---|---|---|---|---|
| GRAVITY, API | 63.8 | 65.8 | 63.9 | 64.1 | 63.3 | 63.5 | 63.7 | 64.5 | 64.0 | 65.3 | 63.5 |
| APPEARANCE | B/C | B/C | B/C | B/C | B/C | B/C | B/C | B/C | B/C | B/C | B/C |
| BENZENE, VOL %, D5580 | 0.75 | 0.77 | 0.81 | 0.82 | 0.81 | 0.83 | 0.80 | 0.53 | 0.53 | 0.61 | 0.66 |
| CORROSION, CU STRIP © 122 F. | 1A | 1A | 1A | 1A | 1A | 1A | 1A | 1A | 1A | 1A | 1A |
| DISTILLATION, F., D86 | | | | | | | | | | | |
| 10% EVAPORATED | 130 | 111 | 120 | 123 | 82 | 116 | 125 | 119 | 125 | 120 | 126 |
| 50% EVAPORATED | 197 | 199 | 197 | 191 | 198 | 196 | 189 | 185 | 197 | 184 | 191 |
| 90% EVAPORATED | 280 | 274 | 272 | 280 | 277 | 275 | 272 | 277 | 275 | 275 | 278 |

TABLE 3-continued

| | | | | | | | | | | | |
|---|---|---|---|---|---|---|---|---|---|---|---|
| END POINT | 376 | 340 | 348 | 376 | 346 | 366 | 357 | 369 | 369 | 363 | 366 |
| RESIDUE, VOLUME % | 1.0 | 1.4 | 1.1 | 1.0 | 1.3 | 1.1 | 1.0 | 0.9 | 0.8 | 0.7 | 0.8 |
| DRIVEABILITY INDEX | 1066 | 1037 | 1043 | 949 | 1036 | 1037 | 1029 | 1010 | 1054 | 1008 | 1039 |
| EXISTENT GUM, MG/100 ML | 1 | 1 | 1.0 | 1 | 1 | 1.0 | 1 | 1 | 1 | 1 | 1 |
| INDUCTION, HOURS | 4+ | 4+ | 4+ | 4+ | 4+ | 4+ | 4+ | 4+ | 4+ | 4+ | 4+ |
| LEAD CONTENT, G/GAL | 0.001 | 0.008 | 0.008 | 0.007 | 0.007 | 0.006 | 0.006 | 0.001 | 0.001 | 0.001 | 0.001 |
| OXYGEN, WEIGHT %, D4815 | 0.03 | 0.09 | 0.04 | 0.10 | 0.52 | 0.16 | 0.46 | 0.01 | 0.01 | 0.01 | 0.01 |
| SULFUR, PPM, D2622 | 25 | 28 | 28 | 4 | 20 | 18 | 25 | 16 | 17 | 30 | 25 |
| OCTANE NUMBER, RESEARCH | 92.4 | 92.9 | 94.2 | 92.1 | 93.1 | 93.4 | 92.8 | 90.6 | 90.7 | 91.0 | 91.1 |
| OCTANE NUMBER, MOTOR | 85.7 | 85.9 | 86.3 | 86.4 | 85.5 | 85.8 | 85.0 | 83.7 | 83.5 | 83.3 | 83.7 |
| RESEARCH + MOTOR OCTANE/2 | 89.0 | 89.4 | 90.2 | 89.2 | 89.3 | 89.6 | 88.9 | 87.1 | 87.1 | 87.1 | 87.4 |
| VAPOR/LIQ. RATIO OF 20° F. | 140 | 126 | 132 | 135 | 126 | 129 | 139 | 118 | 132 | 120 | 133 |
| REID VAPOR PRESSURE, PSI | 8.70 | 11.45 | 10.30 | 8.99 | 11.90 | 10.73 | 8.60 | 11.75 | 10.06 | 11.65 | 9.68 |
| AROMATICS, VOL %, D5580 | 20.9 | 18.3 | 22.0 | 23.0 | 23.1 | 24.2 | 20.7 | 20.6 | 22.3 | 21.6 | 24.3 |
| OLEFINS, VOL %, D1319 | 5.0 | 7.4 | 6.7 | 1.5 | 5.5 | 5.3 | 6.2 | 2.3 | 4.2 | 6.4 | 4.0 |

| BLEND QUALITIES | NO. 12 | NO. 13 | NO. 14 | NO. 15 | NO. 16 | NO. 17 | NO. 18 | NO. 19 | NO. 20 | NO. 21 |
|---|---|---|---|---|---|---|---|---|---|---|
| GRAVITY, API | 64.6 | 63.9 | 61.5 | 62.7 | 62.3 | 68.4 | 66.4 | 67.5 | 61.4 | 63.2 |
| APPEARANCE | B/C | B/C | B/C | B/C | B/C | B/C | B/C | B/C | B/C | B/D* |
| BENZENE, VOL %, D5580 | 0.55 | 0.51 | 0.67 | 0.70 | 0.75 | 0.39 | 0.38 | 0.36 | 0.56 | 0.67 |
| CORROSION, CU STRIP © 122 F. | 1A | 1A | 1A | 1A | 1A | 1A | 1A | 1A | 1A | 1A |
| DISTILLATION, F., D86 | | | | | | | | | | |
| 10% EVAPORATED | 127 | 130 | 129 | 123 | 123 | 116 | 125 | 122 | 129 | 124 |
| 50% EVAPORATED | 195 | 193 | 190 | 182 | 184 | 205 | 203 | 202 | 197 | 195 |
| 90% EVAPORATED | 278 | 281 | 296 | 290 | 295 | 275 | 278 | 279 | 285 | 282 |
| END POINT | 369 | 369 | 358 | 365 | 359 | 370 | 381 | 381 | 372 | 371 |
| RESIDUE, VOLUME % | 0.9 | 0.9 | 0.8 | 0.8 | 0.6 | 1.0 | 1.1 | 0.9 | 0.9 | 1.0 |
| DRIVEABILITY INDEX | 1057 | 1055 | 1060 | 1021 | 1032 | 1064 | 1075 | 1068 | 1070 | 1053 |
| EXISTENT GUM, MG/100 ML | 1 | 1 | 1 | 1 | 1 | 1 | 1 | 1 | 1 | 0 |
| INDUCTION, HOURS | 4+ | 4+ | 4+ | 4+ | 4+ | 4+ | 4+ | 4+ | 4+ | 4+ |
| LEAD CONTENT, G/GAL | 0.001 | 0.001 | 0.000 | 0.001 | 0.001 | 0.000 | 0.002 | 0.001 | 0.001 | 0.001 |
| OXYGEN, WEIGHT %, D4815 | 0.01 | 0.02 | 0.00 | 0.01 | 0.01 | 0.01 | 0.00 | 0.01 | 0.03 | 0.03 |
| SULFUR, PPM, D2622 | 29 | 27 | 29 | 23 | 30 | 40 | 33 | 23 | 19 | 22 |
| OCTANE NUMBER, RESEARCH | 91.0 | 91.0 | 91.1 | 90.9 | 91.3 | 92.5 | 91.8 | 92.3 | 93.0 | 93.1 |
| OCTANE NUMBER, MOTOR | 83.8 | 83.9 | 83.2 | 83.3 | 83.1 | 86.0 | 86.3 | 86.9 | 85.2 | 85.5 |
| RESEARCH + MOTOR OCTANE/2 | 87.4 | 87.4 | 87.1 | 87.1 | 87.2 | 89.2 | 89.0 | 89.6 | 89.1 | 89.3 |
| VAPOR/LIQ. RATIO OF 20° F. | 134 | 139 | 136 | 125 | 127 | 120 | 134 | 127 | 137 | 126 |
| REID VAPOR PRESSURE, PSI | 9.39 | 8.67 | 9.09 | 11.06 | 10.50 | 12.67 | 9.53 | 10.67 | 8.98 | 10.44 |
| AROMATICS, VOL %, D5580 | 20.1 | 22.0 | 26.2 | 26.9 | 23.4 | 10.4 | 13.6 | 16.0 | 24.0 | 25.1 |
| OLEFINS, VOL %, D1319 | 2.7 | 5.9 | 5.9 | 3.7 | 6.3 | 7.2 | 3.0 | 2.0 | 4.2 | 5.3 |

EXAMPLE 2

A premium blend winter gasoline was prepared on a laboratory scale using normal butane, normal pentane, isopentane, toluene, reformate, FCC light, isomerate, rerun alkylate and whole alkylate as the components, with the properties being measured. Such a gasoline composition, as shown in Example 1, could also be prepared using the blending system of the present invention, i.e., as depicted in FIG. 1. The gasoline blend had the following qualities:

| | |
|---|---|
| Octane Number, Research | 95.6 |
| Octane Number, Motor | 89.2 |
| (Research + Motor Octane)/2 | 92.4 |
| RVP, psi | 11.80 |
| Driveability Index | 1030 |
| Aromatics, LV % | 14.2 |
| Olefins, LV % | 1.5 |
| Benzenes, LV % | 0.10 |
| Sulfur, ppm | 10 |
| D-86, 10° F. | 109 |
| D-86, 50° F. | 209 |
| D-86, 90° F. | 239 |

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A method of blending unleaded gasolines which are substantially free of oxygenates and which have a Reid vapor pressure of greater than or equal to 7.00 and less than or equal to 15.00 psi, which method comprises (a) blending some or all gasoline component streams from an oil refinery and keeping the blend substantially free of oxygenates and with a sulfur content no greater than 5 ppm, and (b) controlling the blending of the streams such that the blended unleaded gasolines are in compliance with the California Phase 3 Predictive Model.

2. The method of claim 1, wherein the blending of the streams from an oil refinery is on a continuous basis.

3. The method of claim 1, wherein testing of the blended unleaded gasoline is conducted for compliance with the California Phase 3 Predictive Model, and necessary adjustments in the blends based on the results of the testing are made to maintain compliance with the California Phase 3 Predictive Model.

4. The method of claim 3, wherein the testing is conducted on a continuous basis.

5. The method of claim 3, wherein the testing is conducted on a periodic basis.

6. The method of claim 2, wherein testing of the blended unleaded gasoline is conducted for compliance with the California Phase 3 Predictive Model, and necessary adjustments in the blends based on the results of the testing are made to maintain compliance with the California Phase 3 Predictive Model.

7. The method of claim 1, wherein the streams are blended so as to provide a gasoline having a Reid vapor pressure of less than 15.0.

8. The method of claim 1, wherein the streams are blended such that the blended gasoline has a Reid vapor pressure and a range from about 8 to 13.5.

9. The method of claim 1, wherein the streams are blended such that the blended gasoline has an octane in the range of 87 to 89 (R+M)/2.

10. The method of claim 1, wherein the streams are blended such that the blended gasoline has an octane in the range of from 89 to 92 (R+M)/2.

11. The method of claim 1, wherein the streams are blended such that the blended gasoline has an octane rating of greater than 92 (R+M)/2.

12. The method of claim 1, wherein the streams are blended such that the blended gasoline is in compliance with the flat specification compliance option of CARB.

13. The method of claim 1, wherein the streams are blended such that the blended gasoline is in compliance with the averaging specification compliance option of CARB.

14. The method of claim 1, wherein the streams blended result in a blended gasoline having less than 0.5 wt. % oxygenates.

15. The method of claim 1, wherein the streams blended are blended such that the resulting blended gasoline contains less than 0.1 wt. % oxygenates.

16. The method of claim 1, wherein the streams are blended such that the blended gasoline contains less than 0.05 wt. % oxygenates.

17. The method of claim 1, wherein the streams are blended such that the blended gasoline contains less than 4 vol. % olefins.

18. The method of claim 17, wherein the blended gasoline contains less than 3 vol. % olefins.

19. The method of claim 17, wherein the blended gasoline contains less than 2 vol. % olefins.

20. The method of claim 1, wherein the streams are blended such that the blended gasoline exhibits a $T_{50}$ of less than 203° F.

21. The method of claim 20, wherein the blended gasoline exhibits a $T_{50}$ of less than 200° F.

22. The method of claim 20, wherein the blended gasoline exhibits a $T_{50}$ of less than 190° F.

23. The method of claim 1, when the streams are blended such that the blended gasoline contains less than 0.5 vol. % benzene.

24. A blended gasoline composition prepared by the method of claim 1.

25. The composition of claim 24, wherein Reid vapor pressure of less than 15.0.

26. The composition of claim 24, wherein the blended gasoline composition has an octane of 87 to 89 (R+M)/2.

27. The gasoline composition of claim 24, wherein the composition has an octane from 89 to 92 (R+M)/2.

28. The gasoline composition of claim 24, wherein the gasoline has an octane of greater than 92 (R+M)/2.

29. The gasoline composition of claim 24, wherein the composition contains less than 0.5 wt. % oxygenates.

30. The gasoline composition of claim 24, wherein the composition contains less than 0.1 wt. % oxygenates.

31. The gasoline composition of claim 24, wherein the composition contains less than 0.05 wt. % oxygenates.

32. The gasoline composition of claim 24, wherein the composition contains less than 4 vol. % olefins.

33. The gasoline composition of claim 24, wherein the composition contains less than 3 vol. % olefins.

34. The gasoline composition of claim 24, wherein the composition contains less than 2 vol. % olefins.

35. The gasoline composition of claim 24, wherein the composition exhibits a $T_{50}$ of less than 203° F.

36. The gasoline composition of claim 24, wherein the composition exhibits a $T_{50}$ of less than 200° F.

37. The gasoline composition of claim 24, wherein the composition exhibits a $T_{50}$ of less than 190° F.

38. The gasoline composition of claim 24, wherein the composition less than 0.5 vol. % benzene.

39. A gasoline composition which is substantially free of oxygenates and is in compliance with the California Phase 3 Predictive Model, and contains no greater than 5 ppm sulfur.

40. The gasoline composition of claim 39, wherein the gasoline has a Reid vapor pressure of less than 15.0.

41. The gasoline composition of claim 39, wherein the gasoline composition has an octane of 87 to 89 (R+M)/2.

42. The gasoline composition of claim 39, wherein the composition has an octane from 89 to 92 (R+M)/2.

43. The gasoline composition of claim 39, wherein the composition has an octane of greater than 92 (R+M)/2.

44. The gasoline composition of claim 39, wherein the composition contains less than 0.5 wt. % oxygenates.

45. The gasoline composition of claim 39, wherein the composition contains less than 0.1 wt. % oxygenates.

46. The gasoline composition of claim 39, wherein the composition contains less than 0.05 wt. % oxygenates.

47. The gasoline composition of claim 39, wherein the composition contains less than 4 vol. % olefins.

48. The gasoline composition of claim 39, wherein the composition contains less than 3 vol. % olefins.

49. The gasoline composition of claim 39, wherein the composition contains less than 2 vol. % olefins.

50. The gasoline composition of claim 39, wherein the composition exhibits a $T_{50}$ of less than 203° F.

51. The gasoline composition of claim 39, wherein the composition exhibits a $T_{50}$ of less than 200° F.

52. The gasoline composition of claim 39, wherein the composition exhibits a $T_{50}$ of less than 190° F.

53. The gasoline composition of claim 39, wherein the composition contains less than 0.5 vol. % benzene.

54. The gasoline composition of claim 39, wherein the composition contains less than 0.1 wt. % oxygenates and less than 10 ppm sulfur.

55. The gasoline composition of claim 54, wherein the composition contains less than 5 ppm sulfur.

56. The gasoline composition of claim 39, wherein the composition exhibits a $T_{50}$ of less than 203° F. and contains less than 10 ppm sulfur.

57. The method of claim 1, wherein the streams are blended so as to provide a gasoline having a Reid vapor pressure of greater than 7.2.

58. The gasoline compsition of claim 24, wherein the streams are blended so as to provide a gasoline having a Reid vapor pressure of greater than 7.2.

59. The gasoline composition of claim 39, wherein the streams are blended so as to provide a gasoline having a Reid vapor pressure of greater than 7.2.

* * * * *